Nov. 20, 1928.
W. WAIT, JR
1,692,010
RETRACTABLE LANDING GEAR
Filed Feb. 14, 1925
2 Sheets-Sheet 1
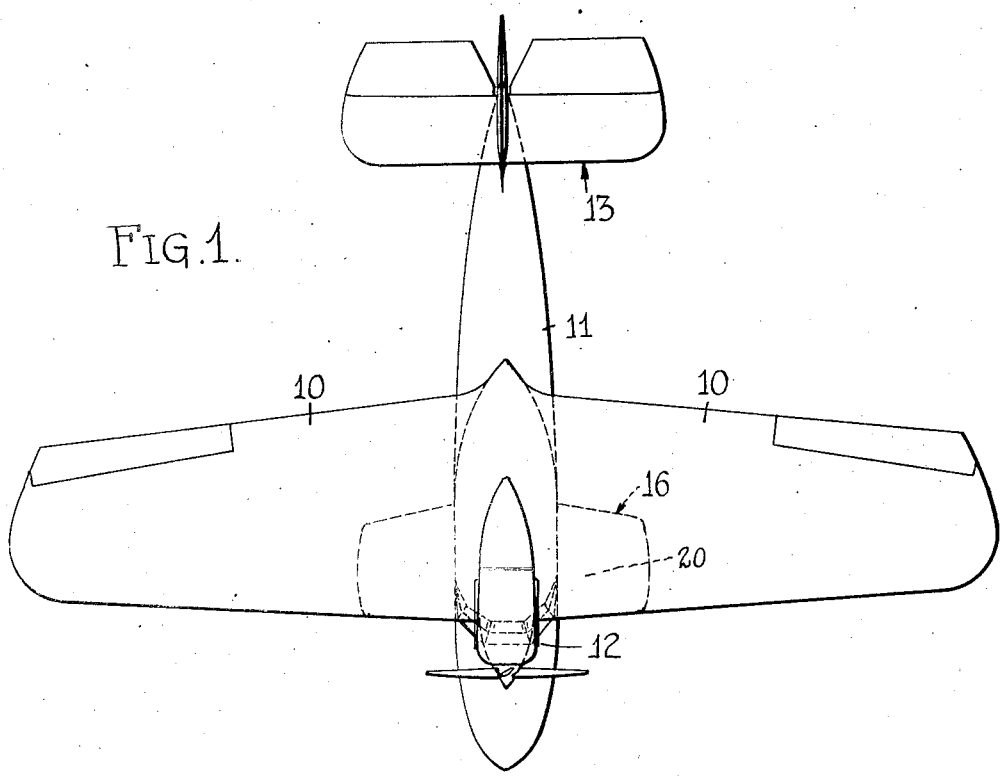
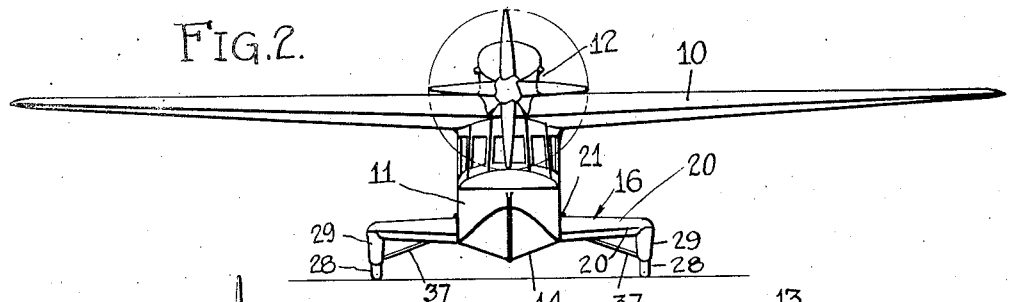
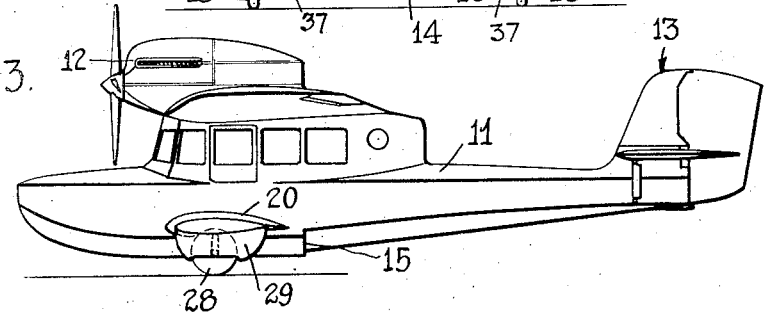
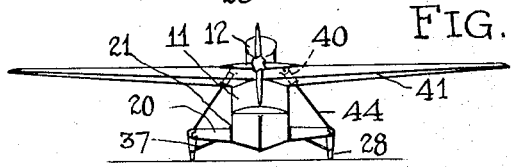
INVENTOR
WILLIAM WAIT JR.
BY
ATTORNEY Nov. 20, 1928.  
W. WAIT, JR  
1,692,010  
RETRACTABLE LANDING GEAR  
Filed Feb. 14, 1925   2 Sheets-Sheet 2
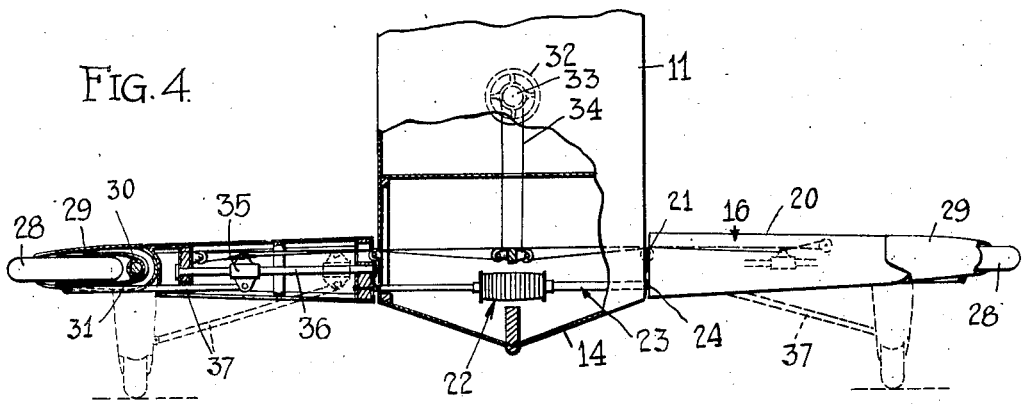
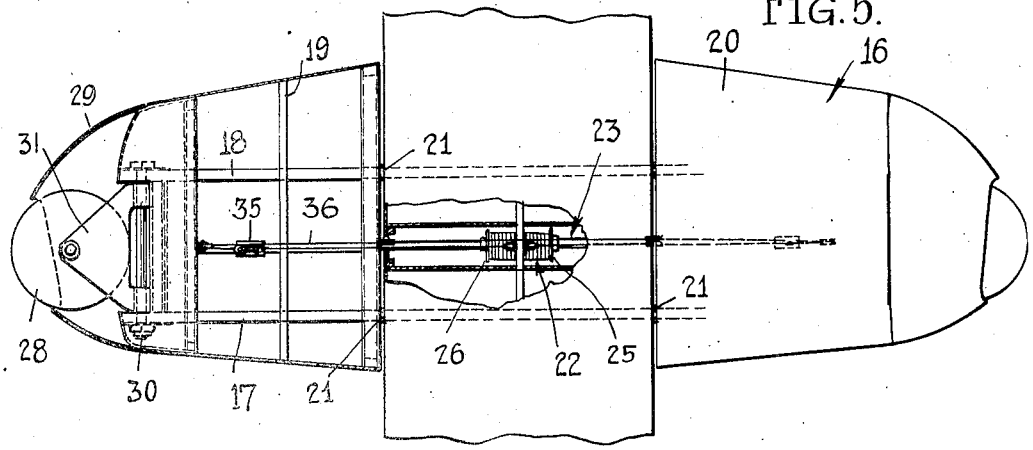
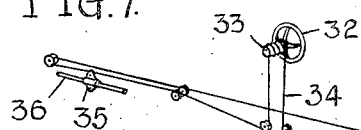
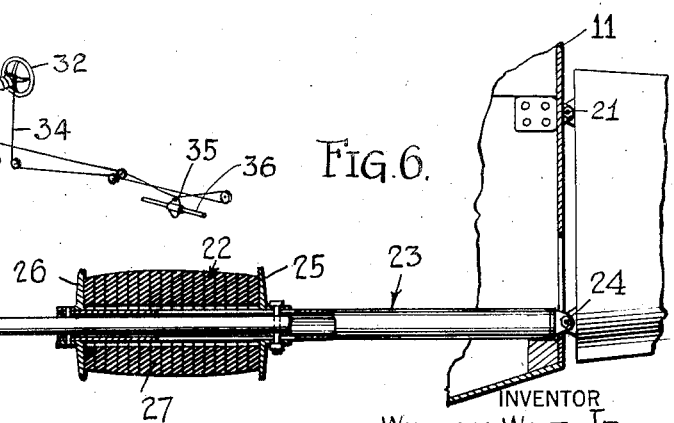
INVENTOR  
WILLIAM WAIT JR.  
BY  
ATTORNEY Patented Nov. 20, 1928.

1,692,010

UNITED STATES PATENT OFFICE.

WILLIAM WAIT, JR., OF GARDEN CITY, NEW YORK, ASSIGNOR TO CURTISS AEROPLANE & MOTOR CO., INC., A CORPORATION OF NEW YORK.

RETRACTABLE LANDING GEAR.

Application filed February 14, 1925. Serial No. 9,120.

My invention relates to aeroplanes and is more particularly concerned with "amphibians", i. e., aeroplanes adapted to land, air and water operation.

In the drawings, wherein like reference characters denote like or corresponding parts, Fig. 1 is a plan view of an aeroplane having its parts arranged as hereinafter pointed out;

Fig. 2 is a front end elevation;

Fig. 3 is a side elevation;

Fig. 4 is a detail front end elevation, partly in section, of the landing gear per se;

Fig. 5 is a plan view of the landing gear, a portion of the covering of one of the stub wings thereof having been removed;

Fig. 6 is a detail view, partly in elevation and partly in section, of the landing gear shock absorbing means;

Fig. 7 is a diagrammatic view of the mechanism used to extend and retract the landing gear wheels, and Fig. 8 is a front end elevation of a modified form of craft.

In the embodiment of the invention selected for illustration, a monoplane type boat is shown. Preferably such craft includes supporting surfaces 10, a flotation body 11, a propelling power plant 12, and a tail unit or empennage 13. The flotation body 11 is of the long tail type and is provided with a V-bottom 14 having formed therein, intermediately of its ends, a rearwardly facing transverse step or break 15. That portion of said bottom 14 forward of the step 15 constitutes the hydroplaning surface of the machine. As the relative arrangement of such parts and the function of each is well known, a further description thereof will be omitted.

At opposite sides of the body 11 stub wings or surfaces 16 are disposed. Such wings or surfaces 16 serve a three-fold purpose. When flying, such surfaces 16 add very appreciably to the total wing or supporting surface area of the machine; when hydroplaning such surfaces function as auxiliary hydroplanes and at the same time lend lateral stability to the craft; and, when operated as a land plane, such surfaces provide a support for the landing wheels of the land alighting chassis. In other words, the stub wings or surfaces 16 may be properly designated either as supporting surfaces, as sponsons, or as supports, according to the particular function which said surfaces perform under the different conditions of operation. Structurally said surfaces 16, include a forward wing beam 17, a rear wing beam 18, ribs 19 and an appropriate outer covering 20. The wing beams 17 and 18 are hinged as at 21 to the sides of the body 11, the axes of the respective hinges, in each instance, extending in a fore and aft direction. Being thus hinged, the surfaces 16 are adapted to yield or move relatively to the body 11 in response to either land operating or hydroplaning shocks.

To resist movement of the wings or surfaces 16, they, the wings are interconnected by suitable shock absorbing means 22. Said means 22 (see Fig. 6) comprises a telescopic tube 23, the sections of which are fastened respectively as at 24 to the inner ends of the opposed stub wings, the points of attachment 24 being located below the hinge points 21. The shock absorbing means 22 is wholly enclosed within the body 11 of the craft. In addition to the telescopic tube 23 said means 22 includes abutments 25 and 26 mounted respectively upon the engaging tube sections. Between said abutments a tier or group of shock abserber discs (preferably rubber) are interposed, said discs, collectively, affording an appropriate compression shock absorber having sufficient stiffness to properly yieldingly resist the hinged or pivotal movement of the stub wings 16.

At the outer ends of the stub wings or surfaces 16, landing gear wheels 28 are provided, each wheel (see Figs. 4 and 5) being enclosed for the major part within a suitable stream-line housing 29 so formed in transverse section as to provide, in one position of adjustment, a lateral prolongation of the stub wing or surface to which it is hinged as at 30. Each housing or casing 29 is interiorly reinforced as at 31, such reinforcement, together with the casing itself, being designated a wheel supporting frame. Each frame, and consequently the wheels 28, carried thereby, is movable as intimated. During operation of the machine as a watercraft, the frames provided at the wing ends are positioned as indicated in Fig. 4. Thus positioned, said frames augment the area of the stub wings laterally and offer but little parasite resistance in flight. When it is desired that the machine be converted from a water craft to a land craft or machine, it is but necessary to swing said frames downwardly and inwardly throughout an arc of 90° or into positions described as substantially at right angles to the stub wings. Thus positioned, said frames, and consequently the wheels 28 thereof, extend beneath the stub wings and also beneath the bottom hydroplaning surface 14 of the machine. As the wheels 28 are carried by and movable with the stub wings 16, obviously the shock absorbing means 22 previously described, affords an adequate means for taking and absorbing all ground operating and land alighting shocks. Preferably, the casings or housings 29 are so formed and related to the stub wing ends as to admit of the merger of the one into the other without a break in the continuity of the exterior surface of the wings.

The mechanism for extending and retracting the landing gear wheels 28 includes an operating wheel 32, a drum 33 and an endless cord or cable 34 passed over and around the drum. From the drum 33 portions of the cable extend downwardly and thence laterally oppositely thru the hinge axes 21 into the stub wings, the oppositely extending portions of said cable being fastened respectively to slides 35 mounted on rods 36 carried inside the stub wings and extending longitudinally thereof. Said slides 35 are in turn connected by means of rods 37 to the housings 29 of the landing gear wheels. Accordingly, upon rotating the wheel 32, the oppositely extending portions of the cable 34 are either let out or drawn in as the case may be, and since said oppositely extending portions of the cable 34 are crossed as indicated in Fig. 7, the slides 35 will be either drawn inwardly or forced outwardly to either extend or retract the wheel as desired.

An aeroplane characterized as above set forth offers a very minimum of resistance to forward travel regardless of whether it is operated as a land, air or water machine. If operated as a land machine, a land alighting chassis having a very minimum of parasite resistance is provided since the stub wings 16 during such operation enter into and form the necessary supports for the landing wheels. When operated as a water craft, even less resistance is apparent for when thus operating the machine, the rods 37 are enclosed within the stub wing confines and the casings 29 which partly enclose the wheels constitute in effect portions of the stub wing area. Moreover, regardless of operation, all shocks incident to landing are adequately absorbed thru the yielding movement accorded the stub wing surfaces. In the modification of Fig. 8 a similar arrangement is followed. Instead, however, of enclosing the shock absorbing means within the confines of the hull or body of the machine, suitable shock absorbing devices 40 are mounted in the supporting surface 41 of the machine, braces 42 being provided at the stub wing ends to engage the shock absorbers. Otherwise, the arrangement illustrated in Fig. 8 is the same as above described.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What I claim is:

1. In an aeroplane, the combination with a flotation body having substantially V-arranged hydroplaning surfaces formed on the bottom thereof, of aerofoil surfaces hingedly fastened to said body, one each at opposite sides thereof, each said aerofoil being yieldingly movable under impact and having formed on its underside an auxiliary hydroplaning surface in lateral prolongation of one of the V-arranged hydroplaning surfaces of said body, and means for yieldingly restraining the impact movement of said aerofoil surfaces and hence the auxiliary hydroplaning surfaces formed on the underside thereof.

2. In an aeroplane, the combination with a flotation body having substantially V-arranged hydroplaning surfaces formed on the bottom thereof, of aerofoil surfaces hingedly fastened to said body, one each at opposite sides thereof, each said aerofoil surface being yieldingly movable under impact and having formed on its underside an auxiliary hydroplaning surface in lateral prolongation of one of the V-arranged hydroplaning surfaces of said body, and means enclosed within said body for yieldingly restraining the impact movement of said aerofoil surfaces and hence the auxiliary hydroplaning surfaces formed on the underside thereof.

3. In an amphibian aeroplane, the combination with a flotation body having substantially V-arranged hydroplaning surfaces formed on the bottom thereof, of aerofoil surfaces hingedly fastened to said body, one each at opposite sides thereof, each said aerofoil surface being yieldingly movable under impact, shock absorbing mechanism for yieldingly restraining the impact movement of said aerofoil surfaces, auxiliary hydroplaning surfaces formed on the underside of said aerofoil surfaces, retractable landing gear wheels carried by said aerofoil surfaces and means for retracting and extending said wheels.

4. In an aeroplane landing gear, the combination of a body, aerofoil surfaces hingedly fastened to and extending laterally out from said body, one each at opposite sides thereof, each said aerofoil surface being yieldingly movable under impact, landing devices fastened, one to each said aerofoil surface and upon which the weight of the aeroplane is supported while at rest, and shock absorbing mechanism for said landing devices arranged to yieldingly resist the impact movement of said aerofoil surfaces.

5. In an aeroplane landing gear, the combination, of a body, aerofoil surfaces hingedly fastened to and extending laterally out from said body, one each at opposite sides thereof, each said aerofoil surface being yieldingly movable under impact, retractable landing devices fastened, one to each said aerofoil surface and upon which, when extended, the weight of the aeroplane is supported while at rest, means for extending and retracting said landing devices, and shock absorbing mechanism for said landing gear arranged to yieldingly resist the impact movement of said aerofoil surfaces.

In testimony whereof I hereunto affix my signature.

WILLIAM WAIT, Jr.